(12) United States Patent
Girard

(10) Patent No.: US 9,864,515 B1
(45) Date of Patent: Jan. 9, 2018

(54) VIRTUAL JOYSTICK ON A TOUCH-SENSITIVE SCREEN

(71) Applicant: Google Inc., Mountain View, CA (US)

(72) Inventor: Eugene Louis Charles Girard, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 303 days.

(21) Appl. No.: 14/523,601

(22) Filed: Oct. 24, 2014

(51) Int. Cl.
 *G06F 3/048* (2013.01)
 *G06F 3/0488* (2013.01)

(52) U.S. Cl.
 CPC ................ *G06F 3/04886* (2013.01)

(58) Field of Classification Search
 CPC .............. G06F 3/04886; G06F 3/04883
 See application file for complete search history.

(56) References Cited

U.S. PATENT DOCUMENTS

| | | | |
|---|---|---|---|
| 5,489,900 A | 2/1996 | Cali et al. | |
| 5,521,596 A | 5/1996 | Selker et al. | |
| 5,594,618 A | 1/1997 | Sellers | |
| 6,115,030 A * | 9/2000 | Berstis | G05G 9/047 345/158 |
| 6,271,834 B1 | 8/2001 | May et al. | |
| 6,445,382 B1 | 9/2002 | Poole et al. | |
| 6,515,687 B1 | 2/2003 | Wynn et al. | |
| 6,515,689 B1 | 2/2003 | Terashima | |
| 6,642,857 B1 | 11/2003 | Schediwy et al. | |
| 2004/0140956 A1* | 7/2004 | Kushler | G06F 3/04883 345/168 |
| 2008/0309626 A1* | 12/2008 | Westerman | G06F 3/0485 345/173 |
| 2010/0029255 A1* | 2/2010 | Kim | G06F 1/1626 455/414.2 |
| 2011/0096025 A1* | 4/2011 | Slobodin | G06F 3/044 345/174 |
| 2011/0285636 A1 | 11/2011 | Howard et al. | |
| 2013/0036388 A1* | 2/2013 | Kirkpatrick | G06F 3/04883 715/856 |
| 2013/0113720 A1* | 5/2013 | Van Eerd | G06F 3/04883 345/173 |
| 2013/0254660 A1* | 9/2013 | Fujioka | A63F 13/12 715/707 |
| 2013/0285927 A1* | 10/2013 | Pasquero | G06F 3/0237 345/173 |
| 2014/0189532 A1* | 7/2014 | Sivaraman | G06F 3/0488 715/753 |
| 2014/0317549 A1* | 10/2014 | Hwang | G06F 3/04886 715/773 |

* cited by examiner

*Primary Examiner* — Jeffrey A Gaffin
*Assistant Examiner* — Justin Lee
(74) *Attorney, Agent, or Firm* — McDermott Will & Emery LLP

(57) ABSTRACT

Aspects of the subject technology relate to providing a virtual joystick on a touch-sensitive screen. The virtual joystick is associated with an area on the touch-sensitive screen and may be provided for display along with a virtual keyboard. A touch input may be detected on the touch-sensitive screen. A determination may be made as to whether at least a portion of the touch input is within the area on the touch-sensitive screen associated with the virtual joystick. An action associated with a text cursor may be performed based on the touch input.

18 Claims, 10 Drawing Sheets

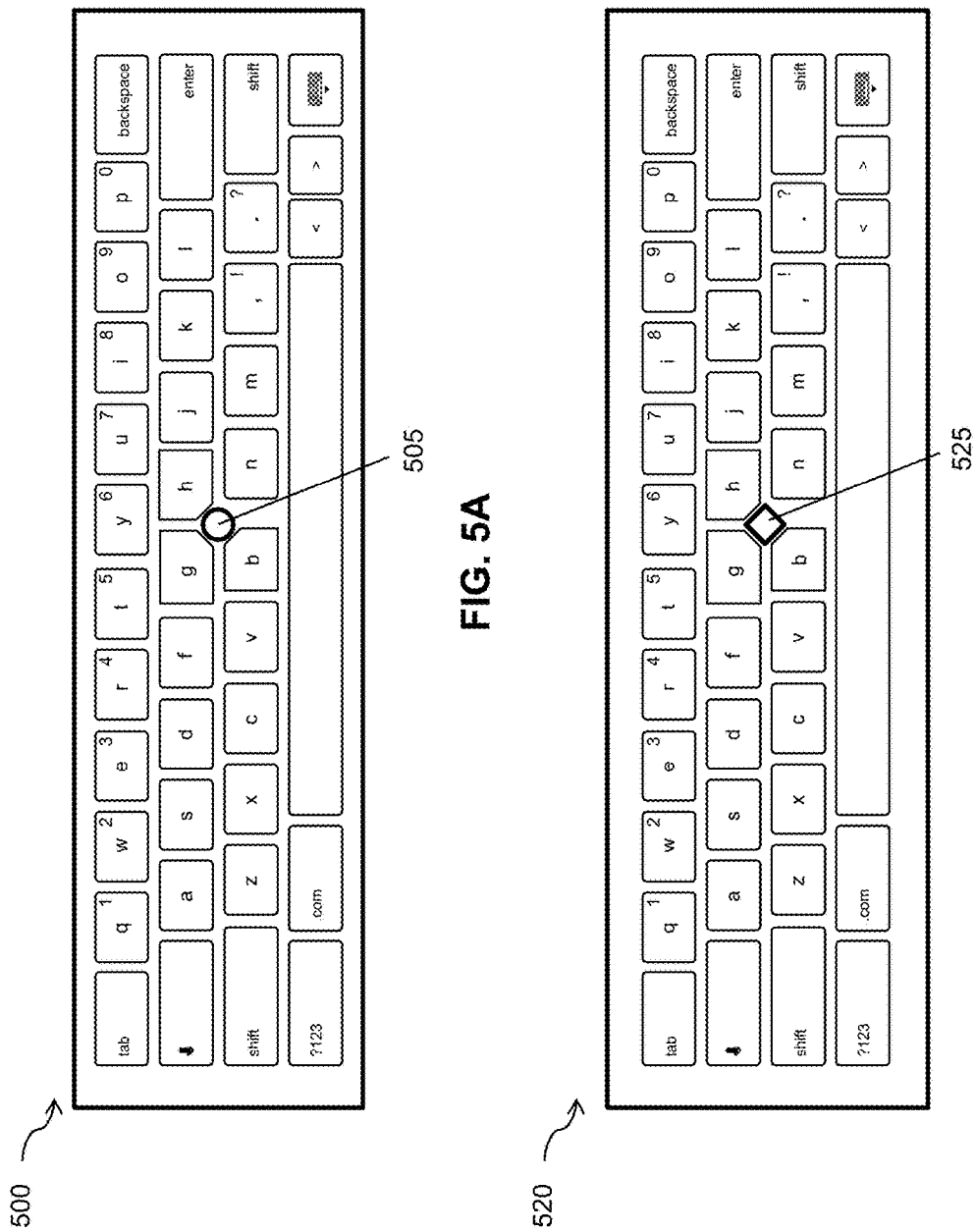

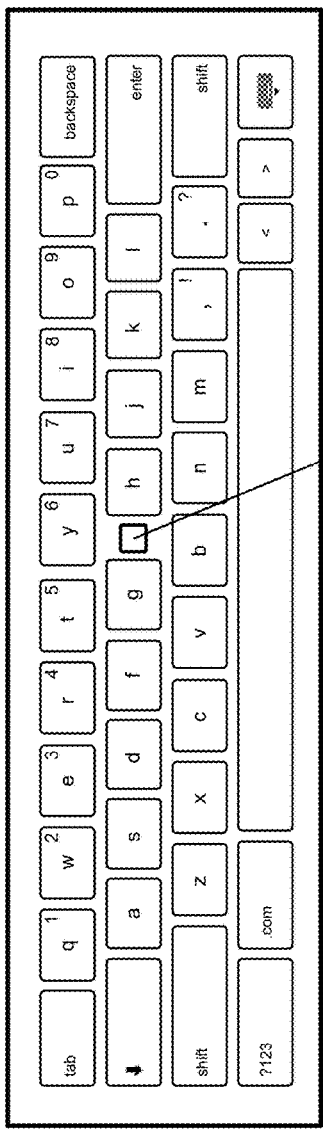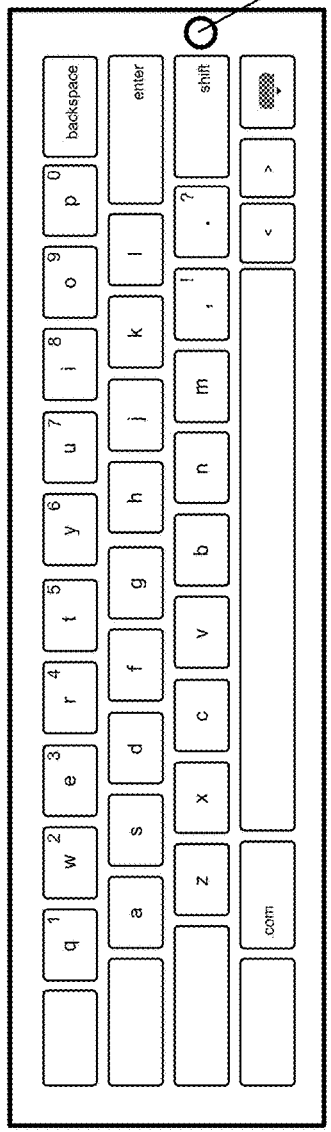
FIG. 5C
FIG. 5D

VIRTUAL JOYSTICK ON A TOUCH-SENSITIVE SCREEN

TECHNICAL FIELD

The present disclosure generally relates to a touch-sensitive screen, and, in particular, to a virtual joystick on a touch-sensitive screen.

BACKGROUND

Computing devices with touch-sensitive screens have improved the way users interact with the computing devices, making the computing devices more intuitive and easier to use. Computing devices with touch-sensitive screens have given rise to graphical user interfaces that accept touch-based interactions.

SUMMARY

Aspects of the subject technology relate to a machine-implemented method. The method includes providing for display a keyboard and a joystick on a touch-sensitive screen of a computing device, where the joystick is associated with a first area on the touch-sensitive screen. The method further includes detecting a touch input on the touch-sensitive screen. The method further includes determining whether at least a portion of the touch input is within the first area. The method further includes, in response to the determining, performing an action associated with a text cursor based on the touch input.

Aspects of the subject technology also relate to a computing system. The computing system includes one or more processors and a non-transitory machine-readable medium including instructions stored therein, which, when executed by the one or more processors, cause the one or more processors to perform operations. The operations include providing for display a keyboard and a joystick on a touch-sensitive screen associated with the computing system, where the joystick is associated with a first area on the touch-sensitive screen. The operations further include detecting a touch input on the touch-sensitive screen. The operations further include determining whether at least a portion of the touch input is within the first area. The operations further include, in response to the determining, performing an action associated with a text cursor based on the touch input. In some implementations, when displayed, the joystick is adjacent to at least two keys of the keyboard.

Aspects of the subject technology also relate to a non-transitory machine-readable medium including instructions stored therein, which when executed by a machine, cause the machine to perform operations. The operations include providing for display a keyboard and a joystick on a touch-sensitive screen, where the joystick is associated with a first area on the touch-sensitive screen. The operations further include detecting a touch input on the touch-sensitive screen. The operations further include determining that at least a portion of the touch input is within the first area. The operations further include performing an action associated with a text cursor based on at least one of a pressure, speed, or duration associated with the touch input.

The description in this summary section may provide some illustrative examples of the disclosure. This section is not intended to be a broad overview or to identify essential elements of the disclosure.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

FIG. 5A shows an example of a graphical user interface displayed on a touch-sensitive screen of a computing device, in accordance with one or more implementations.

FIG. 5B shows another example of a graphical user interface displayed on a touch-sensitive screen of a computing device, in accordance with one or more implementations.

FIG. 5C shows another example of a graphical user interface displayed on a touch-sensitive screen of a computing device, in accordance with one or more implementations.

FIG. 5D shows another example of a graphical user interface displayed on a touch-sensitive screen of a computing device, in accordance with one or more implementations.

DETAILED DESCRIPTION

Figure 1A:
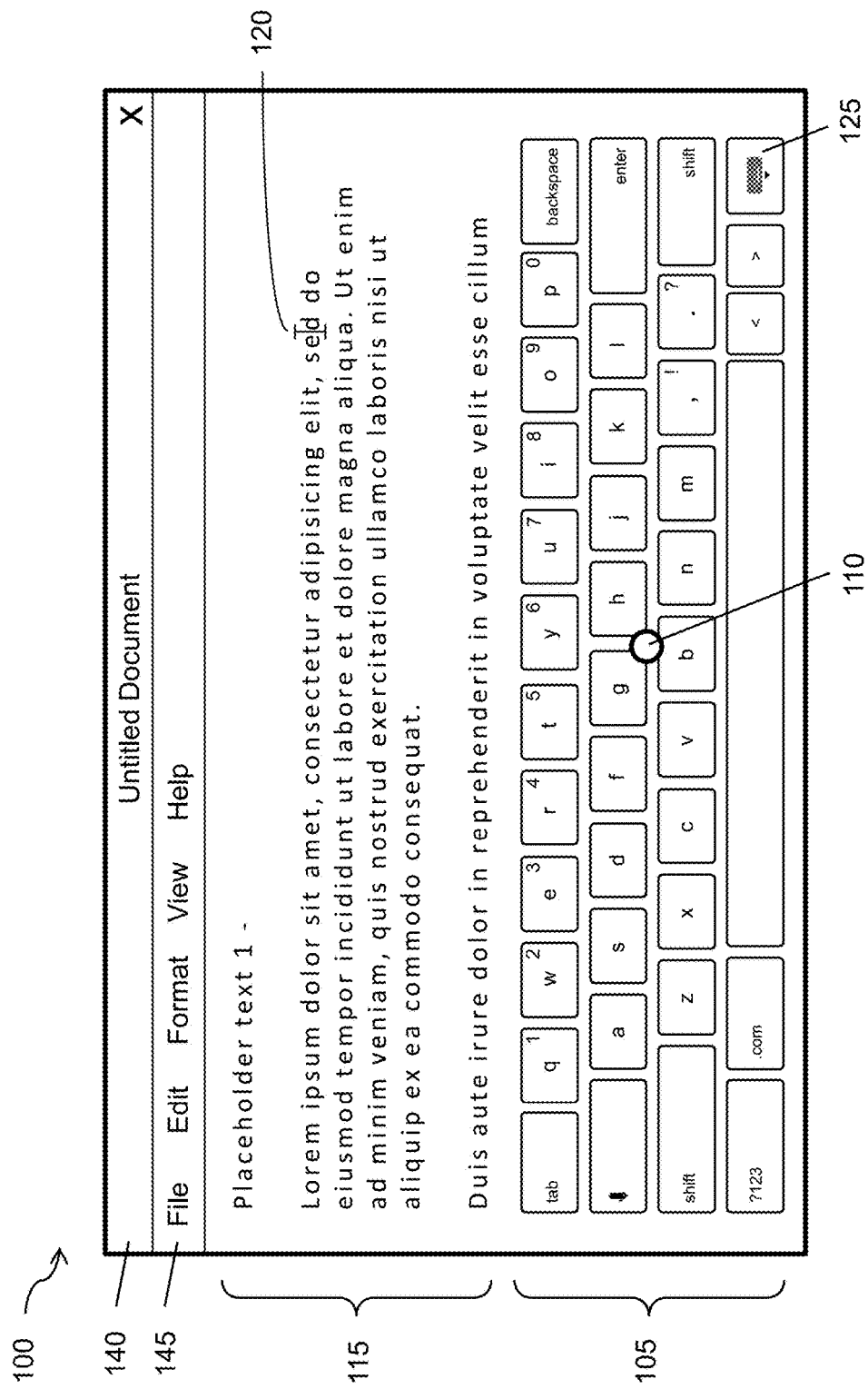
FIG. 1A shows an example of a graphical user interface displayed on a touch-sensitive screen of a computing device, in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Computing devices with a touch-sensitive screen may utilize a virtual keyboard to enable text input that is provided for display on the touch-sensitive screen. For an application that involves text input, a text cursor may be provided for display on the touch-sensitive screen to facilitate navigating and/or editing the text associated with the application. By way of non-limiting example, the application may include a word processor application, text message application, web browser application, among other applications associated with navigating and/or editing text.

For instance, the application may be a word processor application that is running on a computing device on which a user of the computing device is preparing a work product. When the virtual keyboard is displayed on the touch-sensitive screen of the computing device, the virtual keyboard may be overlaid on top of the work product and visually block a part of the work product from the user. Inclusion of multiple additional keys for adjusting a position of the text cursor on the touch-sensitive screen may visually block more of the work product.

The subject technology allows for providing a virtual joystick on a touch-sensitive screen of a computing device. The joystick may be provided for display on the touch-sensitive screen along with a virtual keyboard, where the joystick is associated with an area on the touch-sensitive screen. A touch input, which may also be referred to as a gesture, on the touch-sensitive screen may be detected. When a touch input is detected, a determination may be made as to whether at least a portion of the touch input is within the area on the touch-sensitive screen that is associated with the joystick. The area on the touch-sensitive screen that is associated with the joystick may be referred to herein as the joystick touch area. In response to the determination, an action associated with a text cursor may be performed based on the touch input.

By way of non-limiting example, the touch-sensitive screen may utilize one or more of a resistive touchscreen technology, surface acoustic wave touchscreen technology, capacitive touchscreen technology, among other touchscreen technologies. The touch-sensitive screen may include or may be in communication with (e.g., connected to) one or more sensors that can sense signals (e.g., voltages, sound waves, capacitances) associated with one or more touchscreen technologies and interpret signals as touch input.

FIG. 1A shows an example of a graphical user interface displayed on a touch-sensitive screen 100 of a computing device, in accordance with one or more implementations. A keyboard 105, a joystick 110, and a work product 115 are provided for display within the graphical user interface on the touch-sensitive screen 100. The keyboard 105 is provided to give an appearance of being overlaid on top of a bottom portion of the touch-sensitive screen 100. The joystick 110 is provided to give an appearance of being overlaid on top of the keyboard 105. A text cursor 120 is provided to give an appearance of being overlaid on top of the work product 115. The graphical user interface also displays an application title bar 140 and an application menu bar 145 associated with the work product 115 on the touch-sensitive screen 100. The work product 115 may be a text document or portion thereof opened in a word processor application that is running on the computing device for example. In some aspects, the keyboard 105 is provided for display without navigation keys such as, by way of non-limiting example, arrow keys, Page Up/Down keys, and Home/End keys. In some aspects, navigation keys may be provided in addition to the joystick 110.

As an example, a device such as a cellular phone may have a touch-sensitive screen with a diagonal length of 5 inches. Alphanumeric keys of a keyboard that may be provided for display on the touch-sensitive screen may be around 5-7 millimeters in length and/or width. A circular joystick that may be provided for display on the touch-sensitive screen may be around 4-5 millimeters in diameter. As another example, a relatively larger device, such as a laptop computer, may have a touch-sensitive screen with a diagonal length of around 11-12 inches. Alphanumeric keys of a keyboard that may be provided for display on the touch-sensitive screen may be around 10-11 millimeters in length and/or width. A circular joystick that may be provided for display on the touch-sensitive screen may be around 5-8 millimeters in diameter. Such example dimensions are provided by way of example only, and different dimensions may be utilized. Other shapes for the joystick may be utilized.

In one or more implementations, the joystick 110 may be displayed at a position that is adjacent to at least two keys of the keyboard 105. In FIG. 1A, the joystick 110 is displayed as a circular dot at a position adjacent to the 'g', 'b', and 'h' keys. The joystick 110 may be positioned between keys of the keyboard 105 to allow a user to input text by pressing keys on the keyboard 105 and adjust a position of the text cursor 120 using the joystick 110 without moving the user's hand away from the keyboard 105. Although the joystick 110 may be provided for display as a circular dot positioned adjacent to the 'g', 'b', and 'h' keys, as shown in FIG. 1A, the shape, size, and/or position of the joystick 110 may be different from that shown in FIG. 1A.

Allowing a user to use a joystick without moving the user's hand away from a keyboard may help the user concentrate on typing and/or editing text. This may help prevent the user from losing the user's train of thought relative to a case when the user needs to move one or both hands off of the keyboard or move hand(s) and/or finger(s) to one or more keys at a remote part of the keyboard in order to move the text cursor and/or navigate the work product.

For example, without a joystick, the user's hand or hands may need to move to a location on the touch-sensitive screen area that includes navigation keys, which may be in an area of the keyboard distant from most of the alphanumeric keys of the keyboard (e.g., distant from a home row of the keyboard). As another example, the user's hand or hands may need to move to a location on the touch-sensitive screen area that displays a work product, where the user may select a position in the work product by touching the position on the touch-sensitive screen. Providing a joystick so as to reduce such movements may allow the user to more effectively type (e.g., generally using the alphanumeric keys) and edit (e.g., using at least the joystick). Although the discussion is made with reference to a user's finger or hand, providing such a joystick may reduce such movements when the user is using a stylus or other instrument for providing touch input. The joystick may also allow for more precise movement of the text cursor, such as compared to a case of touching a position on the touch-sensitive screen.

In some implementations, the joystick 110 may be provided for display at a position adjacent to only one key of the keyboard 105 or non-adjacent to any keys of the keyboard 105. The joystick 110 may be provided for display without the keyboard 105 being provided for display. In some aspects, a user may be able to provide user preferences to be applied to the joystick 110 that is displayed on the touch-sensitive screen 100, such as preferences for the shape, size, position, and/or color, among other characteristics, of the joystick 110.

A position of the text cursor 120 is configured to move based on a touch input to the keyboard 105 and/or the joystick 110. A touch input may be provided by a user's finger, a stylus, or other instrument from which the touch-sensitive screen 100 may receive and detect touch input. The user's finger, stylus, and other instrument may be referred to herein as a touch input instrument.

A touch input performed on the keyboard 105 to add or delete text in the word product 115 may cause movement of the text cursor 120. Adding a character may cause the text cursor 120 to progress one character forward in the work product 115. A touch input performed on the joystick 110 may cause movement of the text cursor 120 without adding or deleting text or characters. A combination of touch inputs performed on the joystick 110 and touch inputs on the keyboard 105 facilitates navigating and editing the work product 115.

Figure 1B:
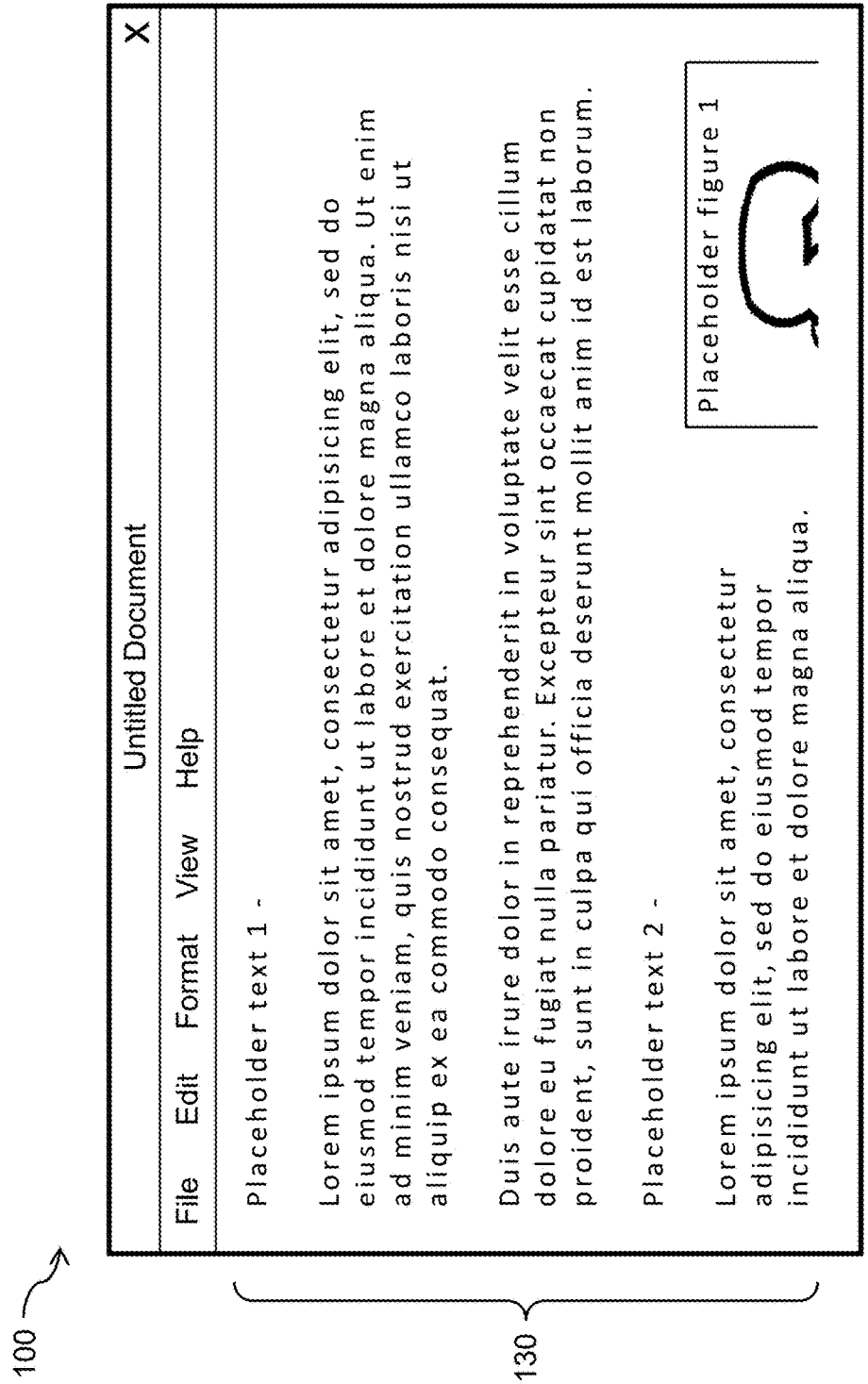
FIG. 1B shows an example of a graphical user interface displayed on a touch-sensitive screen of a computing device, where a keyboard and a joystick are hidden from display, in accordance with one or more implementations.

In some aspects, the keyboard 105 and the joystick 110 is not provided for display or is otherwise hidden from display on the touch-sensitive screen 100. The work product 115 may be a portion of a larger work product for example. Hiding the keyboard 105 and the joystick 110 from display may allow more of the larger work product to be shown to the user. FIG. 1B shows an example of a graphical user interface displayed on the touch-sensitive screen 100 of the computing device, where the keyboard 105 and the joystick 110 of FIG. 1A are hidden from display, in accordance with one or more implementations. The work product 130 shows the work product 115 as well as an additional portion previously obscured by the keyboard 105 and the joystick 110. The text cursor 120 shown in FIG. 1A might or might not be hidden from display on the touch-sensitive screen 100 when the keyboard 105 and the joystick 110 are hidden from display.

The touch-sensitive screen 100 may change from the display shown in FIG. 1A to the display shown in FIG. 1B based on user input or lack thereof. As one example, a user may press a button, such as a button 125 shown in FIG. 1A, that is configured to, if contacted (e.g., pressed and/or tapped), cause the keyboard 105 and joystick 110 to be hidden from display. As another example, the keyboard 105 and joystick 110 may be hidden from display if a user has not provided any touch inputs to the keyboard 105 and joystick 110 for over a predetermined duration of time. Other user inputs or lack of user inputs may be defined and/or utilized to cause the keyboard 105 and joystick 110 to be hidden from display. These user inputs or lack of user inputs (e.g., the predetermined period of time) may be set and/or defined by the user.

In some aspects, the touch-sensitive screen 100 may change from the display shown in FIG. 1B to the display shown in FIG. 1A. For example, a user may perform a touch input that, when performed, causes the keyboard 105 and joystick 110 to be provided for display. The touch input may be touching and/or tapping any area on the work product 130, which may indicate to the computing device that the user wishes to interact with (e.g., edit and/or navigate) the text in the work product 130. Other user inputs or lack of user inputs may be defined and/or utilized to cause the keyboard 105 and joystick 110 to be provided for display. These user inputs or lack of user inputs may be set and/or defined by the user.

In one or more implementations, the keyboard 105 and joystick 110 may be considered hidden from display when some portion of the keyboard 105 and/or joystick 110, but not the entirety of both the keyboard 105 and joystick 110, is hidden from display. When an indication to hide the keyboard 105 and joystick 110 is detected by the computing device, the touch-sensitive screen 100 may provide for display a minimized version of the keyboard 105 and/or joystick 110.

Figure 1C:
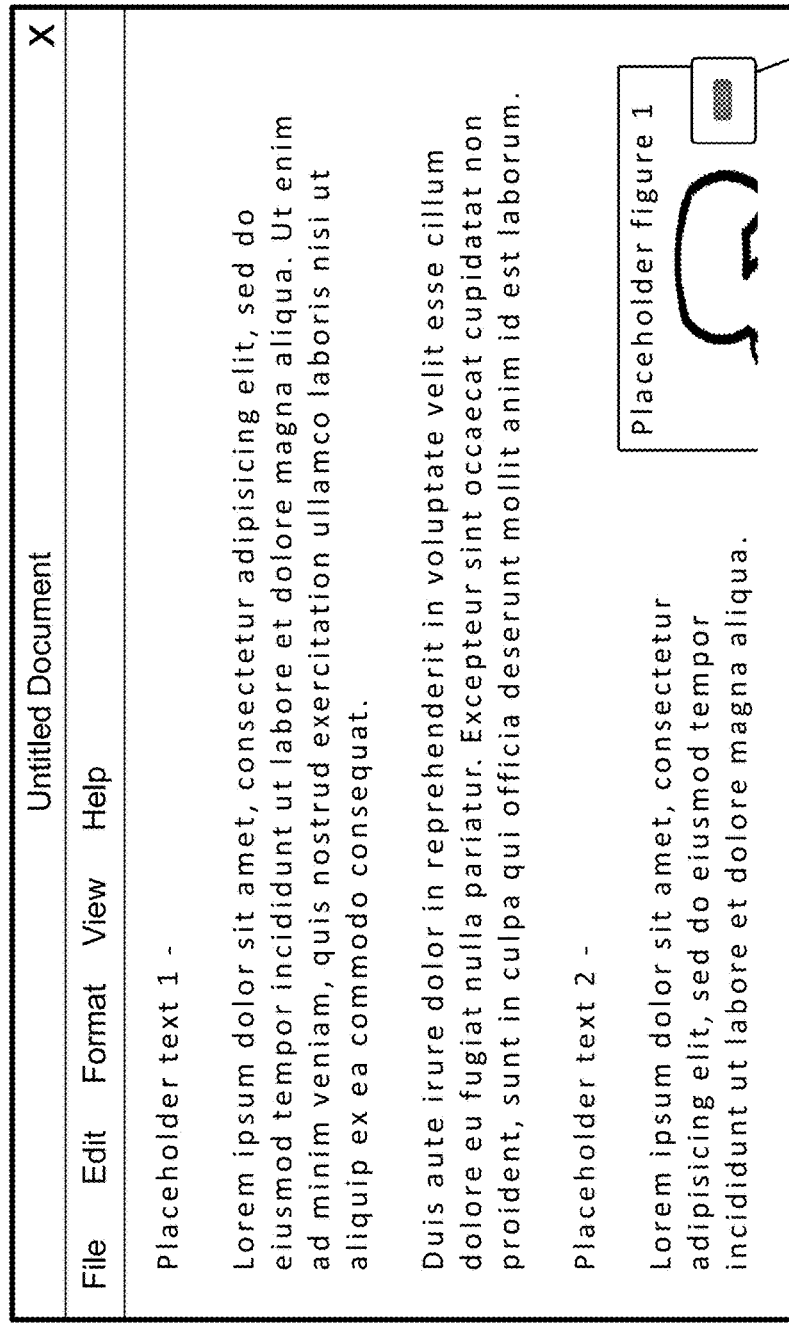
FIG. 1C shows another example of a graphical user interface displayed on a touch-sensitive screen of a computing device, where a keyboard and a joystick are hidden from display, in accordance with one or more implementations.

FIG. 1C shows one such example of a graphical user interface displayed on the touch-sensitive screen 100 of the computing device, in accordance with one or more implementations. In FIG. 1C, the button 125 shown in FIG. 1A is the only portion of the keyboard 105 that is provided for display on the touch-sensitive screen 100 whereas the entirety of the joystick 110 is hidden from display. The button 125 may be configured as a toggle button that, when contacted, may cause the rest of the keyboard 105 and the joystick 110 to be provided for display on the touch-sensitive screen 100 (e.g., going from FIG. 1C to FIG. 1A) or may cause the rest of the keyboard 105 and the joystick 110 to be hidden from display on the touch-sensitive screen 100 (e.g., going from FIG. 1A to FIG. 1C).

The touch-sensitive screen 100 may change between the displays shown in FIGS. 1A and 1C instead of changing between the displays shown in FIGS. 1A and 1B, or vice versa, based on settings of the computing device and/or user preferences. Other manners by which to hide the keyboard 105 and/or joystick 110 are possible, and may be set and/or defined by the user.

In one or more implementations, one or more screens that are displaying work products or portions thereof may be different from a touch-sensitive screen on which a keyboard and/or joystick is displayed. Some, all, or none of the one or more screens may be touch-sensitive screens. A computing device associated with the touch-sensitive screen may be connected to or otherwise in communication with the one or more screens, such that touch input provided to the keyboard and/or joystick may result in changes (e.g., typed characters, moved text cursor) in the work product(s). In some aspects, the touch-sensitive screen on which a keyboard and/or joystick is displayed may display a work product or portion thereof. The touch-sensitive screen and the one or more screens may display different work products, portions of a same work product, and so forth.

Figure 2:
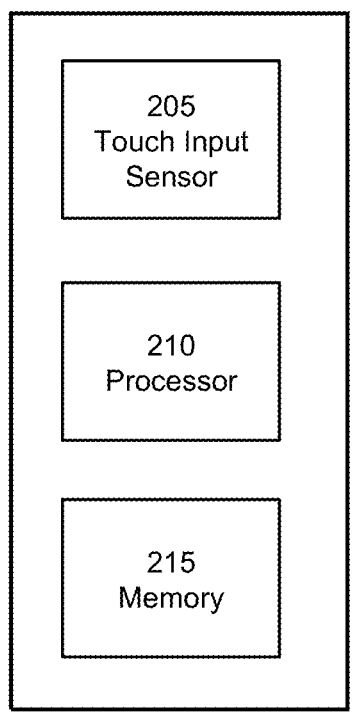
FIG. 2 shows a block diagram illustrating an example system configured to provide a virtual joystick on a touch-sensitive screen associated with the system, in accordance with one or more implementations.

FIG. 2 shows a block diagram illustrating an example system 200 configured to provide for display a virtual joystick on a touch-sensitive screen associated with the system 200, in accordance with one or more implementations. The system 200 includes a touch input sensor 205, a processor 210, and a memory 215 in communication with one another via a bus (not shown). Other systems may include fewer, additional, and/or different components.

The system 200 may be, or may be a part of, a computing device that includes or is otherwise in communication with (e.g., connected to) a touch-sensitive screen. The computing device may be, by way of non-limiting example, a desktop computer, a laptop computer, a handheld computer, a personal digital assistant (PDA), a cellular telephone, a network appliance, a camera, a smart phone, a smart appliance, an enhanced general packet radio service (EGPRS) mobile phone, a media player, a navigation device, an email device, a game console, or a combination of any of these data processing devices or other data processing devices.

For discussion purposes, the system 200 may be considered to be associated with the touch-sensitive screen 100 shown in FIG. 1A, although the discussion generally applies also to other touch-sensitive screens. The touch-sensitive screen 100 may be represented as a two-dimensional coordinate system including horizontal and vertical axes (e.g., x-axis and y-axis) that intersect at an origin point (e.g., 0.0, 0.0). The two-dimensional coordinate system may be defined by the system 200, such as by the touch input sensor 205 and/or the processor 210 of the system 200. In some aspects, the origin point is defined to be one of the corners of the touch-sensitive screen 100.

Each position on the touch-sensitive screen 100 may be mapped to coordinate points of a two-dimensional coordinate system (e.g., two-dimensional Cartesian coordinate system) that identifies a horizontal distance and a vertical distance away from the origin point. The distances may be provided in units of millimeters, inches, and pixels, among others. Since a touch input may be provided by a user's finger, a stylus, or other instrument, each of which has an associated size, a touch input on the touch-sensitive screen 110 generally spans multiple coordinate points. Based on the defined coordinate system, each of the keyboard 105, joystick 110, work product 115, and text cursor 120, among other areas on the touch-sensitive screen 100, may be mapped to a set of coordinates in the defined coordinate system. Each key of the keyboard 105 may be mapped to a set of coordinates.

The touch input sensor 205 may be configured to determine, based on the defined coordinate system, coordinates for each detected touch input. The touch input sensor 205 may detect that an area on the touch-sensitive screen 100 is in contact with a touch input instrument and convert the area into coordinates on the touch-sensitive screen 100. Based on the coordinates associated with a touch input, the touch input sensor 205 may determine the touch input a user has performed (e.g., pressed the 'a' key, tapped the joystick, performed a pinch-to-zoom gesture at coordinates outside of those of the keyboard and the joystick). The graphical user interface on the touch-sensitive screen 100 may be adjusted to reflect the touch input the touch input sensor 205 has determined the user to have performed.

In a case where a touch input is associated with coordinates of two or more different items displayed on the touch-sensitive screen 100 (e.g., two different keys of a keyboard, a key of a keyboard and a joystick, etc.), the touch input sensor 205 may determine the intended item based at least on a comparison of the portion of each item being contacted by the touch input instrument. In some aspects, the item with a largest portion (e.g., highest number of coordinate points) being contacted by the touch input instrument may be determined to be the intended item.

The touch input sensor 205 may also be configured to determine one or more characteristics associated with each detected touch input, such as a pressure, speed, and/or duration associated with each touch input. For example, the touch input sensor 205 may determine a duration (e.g., a length of time) that a coordinate or set of coordinates is in continuous contact with a touch input instrument.

In one or more implementations, a touch input may include, by way of non-limiting example, a user of the device touching, tapping, pressing, or moving across the joystick touch area, or performing a combination thereof. When the touch input is determined to be within at least a portion of the joystick touch area, an action associated with the text cursor may be performed based on the touch input. Table 1 provides an example of touch inputs along with their associated effect or effects. As an example, the touch inputs are considered to be detected within a text document opened in a word processor application on a computing device.

TABLE 1

Example of touch inputs along with associated effect(s)

| Touch input | Effect |
| --- | --- |
| Long press on virtual joystick | Brings up context menu at the text cursor's current position |
| Double tap on virtual joystick | Selects the word containing the text cursor |
| Double tap on virtual joystick, then double-tap again | Selects the sentence containing the text cursor |
| Double tap on virtual joystick, then double-tap again, then double tap a third time | Selects the paragraph containing the text cursor |
| Double tap on virtual joystick (four times) | Selects all of the text in the text document |
| Flick from right to left across virtual joystick | Moves the text cursor to start of the line the text cursor is currently on |
| Flick from left to right across virtual joystick | Moves the text cursor to the end of the line the text cursor is currently on |
| Flick from bottom to top across virtual joystick | Moves the text cursor up one page of the text document |
| Flick from top to bottom across virtual joystick | Moves the text cursor down one page of the text document |
| Touch virtual joystick, then move along a direction across the virtual joystick | Moves the text cursor in the direction of movement across the virtual joystick |
| Tap | Starts a selection; one end of the selection will be located at the text cursor's current position |
| Move cursor while selecting text | Extends the selection |
| Tap while selecting text | Marks the end of selection; a context menu appears above the selection containing option items such as "copy" and "cut" |

By way of non-limiting example, the type of touch input may depend on characteristics such as pressure, speed, and/or duration of the touch input, among other characteristics. The touch input sensor 205 may be configured to measure and/or determine one or more of these characteristics. The touch-sensitive screen 100 may also be calibrated to determine the pressure, speed, and/or duration that a user may utilize to provide different types of touch inputs, such as those shown in Table 1. Classification of the type of a touch input may be determined by one or more components in the computing device (e.g., touch input sensor 205 and/or processor 210).

As an example, detection of a rapid motion upward (e.g., a flick of a finger of the user) across the joystick touch area may move the text cursor up one page of the text document. Detection of a relatively slower motion upward in the joystick touch area may move the text cursor up one line in the text document.

As another example, the touch input may be classified as a long press when the pressure exerted on the area associated with the joystick is above a first predetermined threshold pressure and/or when the duration of the press is longer than a first predetermined threshold duration. In contrast, the touch input may be classified as a tap when the pressure exerted on the area is below a second predetermined threshold pressure and/or when the duration of the tap is shorter than a second predetermined threshold duration. The first and second predetermined threshold pressures might (or might not) be different from one another and, similarly, the first and second predetermined threshold durations might (or might not) be different from one another.

The type of touch inputs and associated effect(s) are provided in Table 1 by way of non-limiting example only. Additional, fewer, or alternative types of touch inputs may be provided in any implementation of the subject technology. In some aspects, a joystick may be moved in more, fewer, or different directions. Touch inputs may be defined to allow the joystick to move the text cursor in diagonal directions for instance. Furthermore, correspondence between a touch input and an associated effect or effects may differ from those provided above. In some aspects, touch inputs may be added, removed, and/or redefined (e.g., such as by a user of the computing device).

In one or more implementations, the computing device is configured to determine whether a touch input is more likely to be intended for the joystick 110 or one of the keys of the keyboard 105 and adjust the text cursor 120 accordingly. For discussion purposes, the determination is made by the touch input sensor 205, although the determination may be made alternatively or in conjunction by the processor 210. In some implementations, the determination may be based on a history of touch inputs provided by a user in addition to the coordinates associated with the touch input. The memory 215 may store the history of touch inputs, where the history may include the most recent touch inputs that precede a current touch input. The memory 215 can store the most recent ten touch inputs for example.

As an example, with reference to the placement of the joystick 110 shown in FIG. 1A, if the user taps characters of the keyboard 105 one after another, the touch input sensor 205 may determine that a touch input where a touch input instrument makes contact with a portion of the joystick touch area is more likely to be intended for one of the keys adjacent to the joystick 110. In making this determination, the touch input sensor 205 may take into consideration the immediate touch input history of the user having tapped characters one after another prior to making contact with a portion of the joystick touch area. As another example, if the user has not tapped any characters in a while and a touch input to touch-and-drag falls within a portion of the joystick touch area, the touch input sensor 205 may determine that the touch input is intended for the joystick 110. In this case, the computing device may be providing a prediction that the user is reviewing text and may wish to move the text cursor 120 to a location on the touch-sensitive screen to begin editing the text.

The touch input sensor 205 may identify patterns associated with a user and make the determinations based at least in part on the patterns. The patterns may be generated based on a history of touch inputs provided by a user. For example, with continued reference to FIG. 1A, a user may have multiple prior instances of performing a touch-and-drag touch input that falls within a portion of the joystick touch area as well as a portion of the character 'b'. Following the touch input, the user may need to tap the backspace button because the character 'b' is provided for display on the touch-sensitive screen 100. After a few such instances, the touch input sensor 205 may adapt the determinations such that, when the user is interacting around the joystick touch area and the area around the character 'b' (e.g., performing a touch-and-drag touch input), a higher likelihood is placed on the user intending to perform a touch input on the joystick 110 and not intending to perform a touch input on the character 'b'. Such patterns may be stored in the computing device, such as in the memory 215.

The touch input sensor 205 may take into consideration a typing speed (e.g., an average typing speed) that may be associated with a user. The typing speed may be considered as a pattern associated with the user. The typing speed may be used to determine an average temporal duration between tapping any two characters of the keyboard 105. For instance, if a touch input instrument makes contact with a portion of the joystick touch area and a current typing speed is significantly lower than the typing speed usually associated with the user, the touch input sensor 205 may determine that the user is intending to select the joystick 110. The user may have slowed down, for example, to evaluate the text and possibly edit the text, using the joystick 110 to move the text cursor 120 to a position in the work product to begin editing. Information associated with a user's typing, such as a typing speed, may be stored in the computing device, such as in the memory 215.

The touch input sensor 205 may be configured to communicate with the processor 210 and provide information associated with the touch input to the processor 210. Classification of the touch input may be performed by the touch input sensor 205 and/or the processor 210. The processor 210 may be configured to interpret various signals provided by the touch input sensor 205 and to execute instructions stored in the memory 215. For example, the processor 210 may be configured to use the signals from the touch input sensor 205 and the instructions from the memory 215 to provide for display a keyboard 105, joystick 110, work product 115, and text cursor 120 on the touch-sensitive screen 100. The processor 210 may update the display on the touch-sensitive screen 100 in almost real time with little delay as touch inputs are being detected by the touch input sensor 205.

The memory 215 may include one or more non-transitory machine-readable media that store one or more sets of instructions that may be executed by the processor 210. The memory 215 may store default options as well as user options and preferences pertaining to details such as where to set a joystick on the touch-sensitive screen 100, what touch inputs cause a keyboard 105 and/or joystick 110 to be provided for display or hidden, which touch inputs cause which effects, and so forth. The memory 215 may also include calibration results for a user, which may be utilized by the touch input sensor 205 to more accurately classify a touch input based on one or more of the touch input location, pressure, speed, and/or duration, among other characteristics.

In one or more implementations, the joystick touch area may include at least the portion of the touch-sensitive screen where the joystick 110 is displayed on the touch-sensitive screen 100. In alternative implementations, the joystick touch area may be different from the joystick 110 that is displayed on the touch-sensitive screen 100. For example, the joystick touch area may include an area that is larger than the joystick 110 that is displayed on the touch-sensitive screen 100, so as to facilitate interaction with the joystick by the user of the device. In some cases, the joystick touch area may include an area that is smaller than the joystick 110 that is displayed on the touch-sensitive screen 100.

The size of the joystick touch area may be adjusted based on a history of touch inputs and/or user typing speed for example. When a user pauses and/or lifts a touch input instrument from the touch-sensitive screen after typing a character, the joystick touch area may be increased in size to facilitate interaction with the joystick 110 by the user of the computing device. When a user is typing one character after another with little pausing (e.g., as determine based on a user's usual typing speed), the joystick touch area may be decreased in size to facilitate interaction with keys of the keyboard 105. In some aspects, a change in the size of the joystick touch area has an associated change in the size of the joystick 110 displayed on the touch-sensitive screen (e.g., the joystick 110 displayed on the touch-sensitive screen 100 is larger when the joystick touch area is larger). In other aspects, a change in the size of the joystick touch area is not accompanied by a change in the size of the joystick 110 displayed on the touch-sensitive screen 100.

In one or more implementations, a computing device with a touch-sensitive screen (e.g., 100) may allow for swipe gesture typing. With swipe gesture typing, a user may enter text by sliding a touch input instrument (e.g., finger, stylus) starting from a first letter of a word and ending at a last letter of the word, with a sequence of trajectories to each of the letters between the first and the last letter of the word. The user may lift the touch input instrument from the touch-sensitive screen between words (e.g., after ending at the last letter of one word and prior to starting at a first letter of another word). Each word may be considered one touch input. For example, a touch input may begin when the touch input instrument makes contact with the touch-sensitive screen at or around the first letter of the word and may end when the touch input instrument is lifted from the touch-sensitive screen at or around the last letter of the word.

Figure 3:
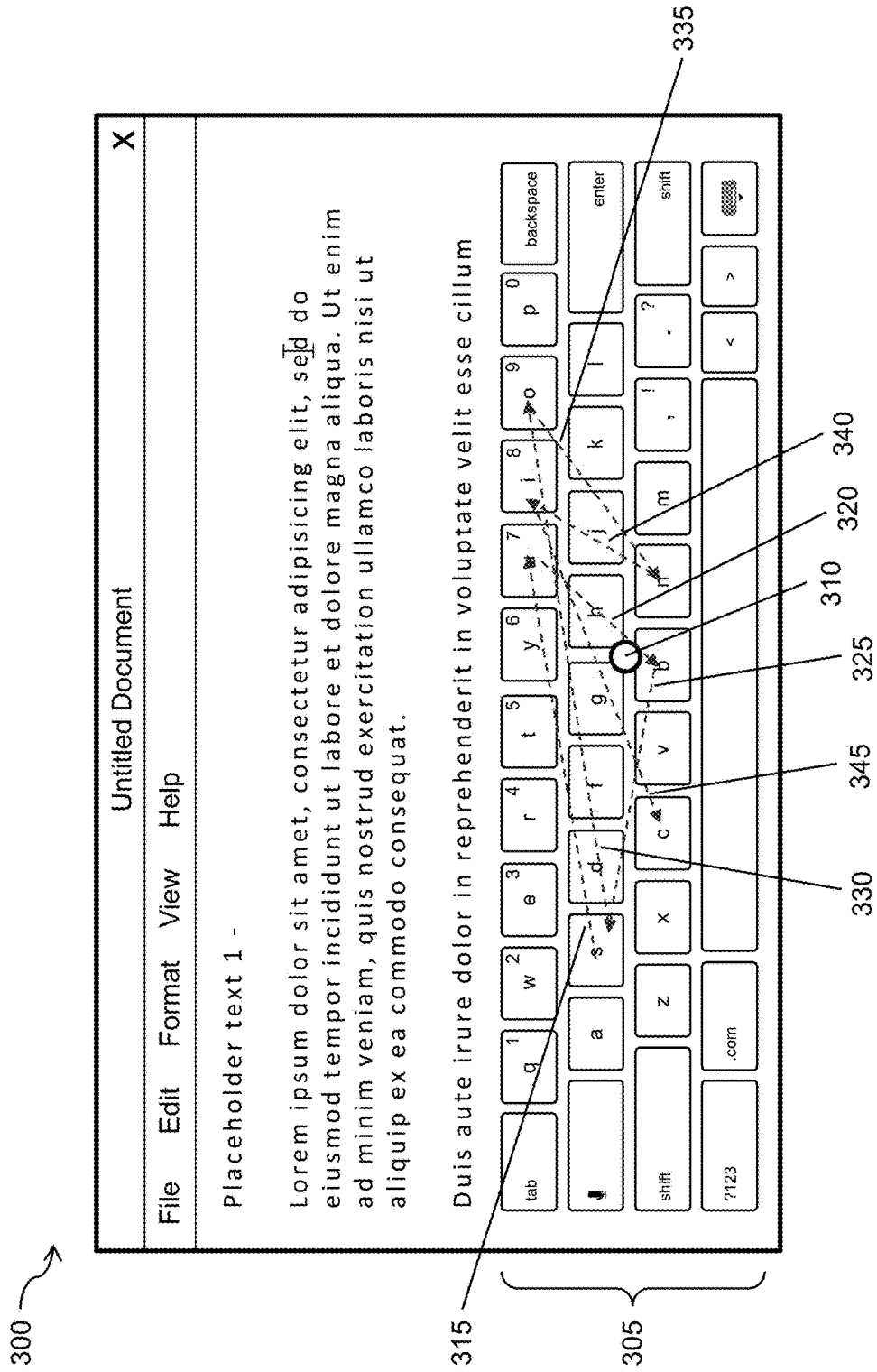
FIG. 3 shows an example of a graphical user interface for a touch-sensitive screen of a computing device on which swipe gesture typing is performed, in accordance with one or more implementations.

FIG. 3 shows an example of a graphical user interface for a touch-sensitive screen 300 of a computing device on which swipe gesture typing is allowed, in accordance with one or more implementations. The touch-sensitive screen 300 provides for display a keyboard 305 and a joystick 310. Also shown in FIG. 3 are example trajectories 315, 320, 325, 330, 335, 340, and 345 of a touch input instrument across the keyboard 305 and/or joystick 310 that may be intended to spell the word "subsonic". Trajectories 315, 320, 325, 330, 335, 340, and 345 show trajectories from 's' to 'u', 'u' to 'b', 'b' to 's', 's' to 'o', 'o' to 'n', 'n' to 'i', and 'i' to 'c', respectively. As shown by trajectories 315, 320, 325, 330, 335, 340, and 345, a trajectory between one character and a next character may cause the touch input instrument to pass through at least a portion of each of multiple keys on the keyboard 305 and/or the joystick 310. Although the discussion to follow is made with reference to swipe gesture typing, the discussion above also applies when a user is typing words without using swipe gesture typing (e.g., tapping one character at a time, lifting the touch input instrument between characters).

The computing device may contain a system (e.g., 200 in FIG. 2) with a sensor (e.g., touch input sensor 205) that is configured to detect each of the trajectories 315, 320, 325, 330, 335, 340, and 345 shown in FIG. 3 and determine which key of the keyboard 305 a user is likely intending to select using the touch input instrument. The sensor may determine that the user is intending to select the characters where the touch input instrument pauses for a predetermined temporal duration and/or starts to change angle or direction of trajectory. Such movements of the touch input instrument may indicate that the user has selected a character is about to steer the touch input instrument towards a next character.

Additionally, the touch input instrument has an associated size and, thus, at a given moment, a portion of the touch input instrument may pause on one key while another portion may pause on another key. The computing device may determine the intended key based at least on a size of a portion of each key that is in contact with the touch input instrument.

A trajectory may pass through the joystick touch area. For example, the trajectory 320 from the character 'u' to 'b' in "subsonic" may cause the touch input instrument to pass through at least a portion of the key 'h' and the joystick touch area. In some aspects, the sensor may be configured to determine that a user is not intending to interact with the joystick 310 once the user has initiated swipe gesture typing by selecting one or more characters. In such a case, the sensor would not classify the trajectory 320 through the joystick touch area as being a touch input on the joystick touch area (e.g., a flick across the joystick touch area). The type of the touch input may be classified as selecting the character 'b' on the keyboard 305.

The computing device can be configured to predict an intended word so that the user might not need to precisely hit each of the respective areas of the first letter, the last letter, and/or letters in between to arrive at the intended word. A word database may be stored, for example, in a memory (e.g., 215) of the computing device, and may include words from one or more dictionaries as well as words manually stored into the word database by a user. With the word database, the computing device may perform a word lookup in a word database to predict the intended word. In some aspects, the computing device may determine the intended combination of keys right after an entire word has been input, when the touch input instrument is likely to be lifted from the touch-sensitive screen. The computing device may provide multiple candidate words for the user to confirm or not confirm. If the computing device does not provide any words that are sufficient to the user, the user may need to delete the text and type new text.

Figure 4:
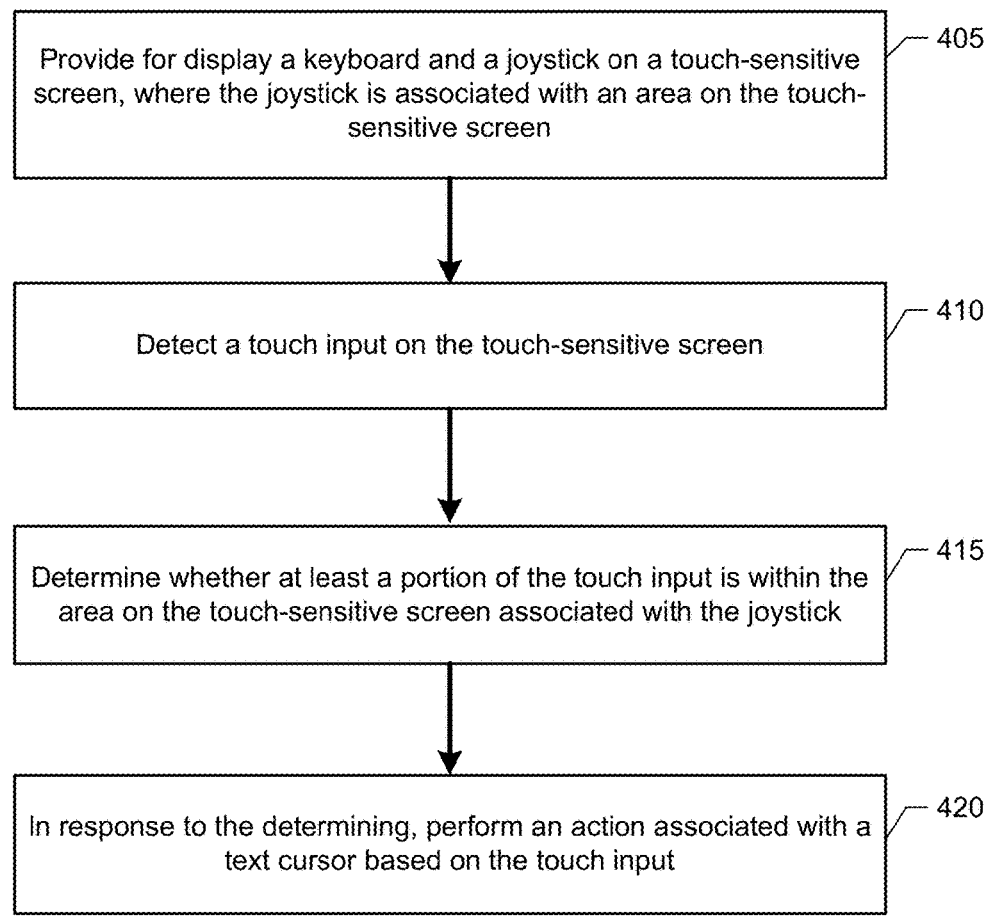
FIG. 4 illustrates a flow diagram of an example process for providing a virtual joystick on a touch-sensitive screen, in accordance with various aspects of the subject technology.

FIG. 4 illustrates a flow diagram of an example process 400 for providing a virtual joystick on a touch-sensitive screen, in accordance with various aspects of the subject technology. For explanatory purposes, the example process 400 is primarily described herein with reference to the touch-sensitive screen 100 of FIG. 1A. The touch-sensitive screen 100 may be associated with the system 200 of FIG. 2, and the example process 400 may be performed by the touch input sensor 205 and/or the processor 210. However, the example process 400 is not limited to the touch-sensitive screen 110 of FIG. 1A and the system 200 of FIG. 2, and the example process 400 may be performed in other computing systems.

At block 405, a keyboard 105 and a joystick 110 is provided for display on a touch-sensitive screen 100 associated with a computing device. The joystick 110 is associated with an area on the touch-sensitive screen 100, referred to as the joystick touch area.

In some aspects, the keyboard 105 and joystick 110 may be provided for display when a user opens and/or switches to an application on the computing device that involves text input. For example, the user may open a text message application that, when opened, causes the keyboard 105 and joystick 110 to be provided for display. In some aspects, the keyboard 105 and joystick 110 may be provided for display when a user interacts with a portion of the application that involves text input. For example, in a web browser application, the keyboard 105 and joystick 110 may be hidden from display by default but may be provided for display when text input is needed (e.g., typing in a uniform resource locator, typing in a text entry field on a web page).

A user may also manually provide an indication to the computing device to have the keyboard 105 and joystick 110 provided for display. Other manners by which to cause the keyboard 105 and joystick 110 to be provided for display are possible.

At block 410, a touch input on the touch-sensitive screen 100 is detected. The touch input may be detected on the touch-sensitive screen 100 when contact is made to the touch-sensitive screen 100 by a touch input instrument.

At block 415, a determination is made as to whether at least a portion of the touch input is within the joystick touch area. In one or more implementations, each of the keys or the keyboard 105 and the joystick 110, among other areas on the touch-sensitive screen 100, is mapped to a respective set of coordinates in a defined coordinate system of the touch-sensitive screen 100. The determination may be made based at least on the coordinates of the touch-sensitive screen 100 associated with the touch input.

At block 420, in response to the determination, an action associated with a text cursor is performed based on the touch input. In some aspects, when at least a portion of the touch input is within the joystick touch area, the touch input is determined to be intended for the joystick 110 and the action performed may include moving the text cursor without adjusting (e.g., adding or deleting) text. The text may be in a text document opened in a word processor application on the computing device.

In one or more implementations, the type of touch input that has been detected is determined. The determination of the type of touch input may be based at least on a history (e.g., immediate history, identified patterns, typing speed) touch inputs prior to a current touch input, in addition to the coordinates of the touch input. For example, a user who is continuously typing a word may have intended to type a character (e.g., 'g' in FIG. 1A), even though at least a portion of the touch input fell within the joystick touch area. The action associated with the text cursor that is performed is based on the determination of the type of the touch input.

In one or more implementations, a feedback (e.g., visual feedback) may be provided as the user provides a touch input. The text cursor may be moving on a touch-sensitive screen as a touch input to move the text cursor is being provided. The text cursor may be blinking when displayed within a work product (e.g., 115 in FIG. 1A). The blinking of the text cursor may be temporally suspended when the text cursor is being moved. A selection of text by the text cursor may cause the selected text to be highlighted.

In some aspects, the feedback may provide to the user an indication as to the effect a gesture may have. For example, as a selection is being extended, the word containing the text cursor may be displayed with a highlight different from the highlight associated with selected text to indicate that flicking the joystick will allow the entire word to be selected. Such a highlight may be of a lighter color (e.g., light blue highlight) than the highlight associated with selected text (e.g., dark blue highlight).

Input of text may also cause movement of the text cursor. Text that is being typed by a user (e.g., touch input to a key on a keyboard) may be provided for display as the user is typing, such as displaying one character at a time or displaying a group of characters at a time (e.g., grouped by characters selected prior to lifting of the touch input instrument). Text that is being deleted by a user may be removed from display as the user is pressing the backspace key or selecting the text and choosing an option to delete or cut the text. One character or a group of characters (e.g., a word) may be removed from display at a time. The character or group of characters being added for display or removed from display to the user may cause corresponding movements of the text cursor.

In some aspects, the shape, size, and/or color of the text cursor may change when a touch input to the joystick touch area is detected. For example, the size of the text cursor may increase from an original size when a touch input to the joystick touch area is detected and may revert back to the original size when no touch input is detected in the joystick touch area. As another example, the color of the text cursor may change from one color (e.g., black) to another color (e.g., red) when a touch input to the joystick touch area is detected. A user may be able to provide user preferences to be utilized for the shape, size, and/or color the text cursor. The user may be able to provide user preferences for when no touch input is detected in the joystick touch area and/or when a touch input is detected in the joystick touch area.

In one or more implementations, functionality of the keyboard and joystick may be tied to an input method editor (IME). As an example, when a user types in a language that the IME associates with a left-to-right environment, the beginning of a line is the leftmost position of the line and the end of the line is the rightmost position of the line, and text is added starting from the left and continuing to the right. As another example, when a user types in a language that the IME associates with a right-to-left environment, the beginning of a line is the rightmost position of the line and the end of the line is the leftmost position of the line, and text is added starting from the right and continuing to the left.

In some aspects, a given document may include content associated with each of the left-to-right and right-to-left environment. A document may have text input of a language associated with a right-to-left environment and also have subsections that contain left-to-right content. For example, the left-to-right content may include numbers.

With reference to Table 1, in some aspects, the joystick may be utilized in a left-to-right environment (e.g., utilized in conjunction with a keyboard for a language associated with a left-to-right environment). When a position of a text cursor (e.g., 120) reaches a beginning (e.g., leftmost position) of a particular line of text in a document on a touch-sensitive screen (e.g., 100) and there are one or more additional lines above the particular line, contacting a joystick touch area and moving left may move the position of a text cursor to a line above the particular line (e.g., rightmost/end position of the line above the particular line). Text in a line above the particular line is considered to be positioned earlier in the document than text in the particular line. A movement of the text cursor "to the left" may be considered a movement of the text cursor to an earlier position in the document.

Similarly, when the position of the text cursor reaches an end (e.g., rightmost position) of a particular line of text in a document on the touch-sensitive screen and there are one or more additional lines below the particular line, contacting the joystick touch area and moving right may move the position of the text cursor to a line below the particular line (e.g., leftmost/beginning position of the line below the particular line). Text in a line below the particular line is considered to be positioned later in the document than text in the particular line. A movement of the text cursor "to the right" may be considered a movement of the text cursor to a later position on the touch-sensitive screen. Other manners by which to define movement of the text cursor once a beginning of a line or end of a line is reached are possible, and may be set and/or defined by the user.

In some aspects, the joystick may be utilized in a right-to-left environment. In such aspects, when the position of the text cursor reaches an end (e.g., leftmost position) of a particular line of text in a document on the touch-sensitive screen and there are one or more additional lines below the particular line, contacting the joystick touch area and moving left may move the position of the text cursor to a line below the particular line (e.g., rightmost/beginning position of the line below the particular line). A movement of the text cursor "to the left" may be considered a movement of the text cursor to a later position in the document. When a position of a text cursor (e.g., 120) reaches a beginning (e.g., rightmost position) of a particular line of text in a document on a touch-sensitive screen (e.g., 100) and there are one or more additional lines above the particular line, contacting a joystick touch area and moving right may move the position of a text cursor to a line above the particular line (e.g., leftmost/end position of the line above the particular line). A movement of the text cursor "to the right" may be considered a movement of the text cursor to an earlier position in the document. Other manners by which to define movement of the text cursor once a beginning of a line or end of a line is reached are possible, and may be set and/or defined by the user.

With reference to Table 1, in some aspects, when a computing device (e.g., touch input sensor 205 of a computing device) determines that a touch followed by a movement along a direction has been detected and is intended for a joystick (e.g., 110) (and not intended for a key of a keyboard (e.g., 105)), continued contact to the touch-sensitive screen without movement may cause the text cursor to continue movement along the direction. For example, a user may touch the joystick with a touch input instrument, move the touch input instrument slightly to the left, and then stop movement of the touch input instrument, while maintaining contact with touch-sensitive screen. The text cursor in such a case may continue to move left so long as the user maintains contact with the touch-sensitive screen and the text cursor is still able to move left (e.g., within the confines of a work product).

The user may be able to move the text cursor to the left faster by continuing to move the touch input instrument to the left while maintaining contact with touch-sensitive screen. Alternatively or in conjunction, the user may be able to move the text cursor to the left faster by maintaining contact with the touch-sensitive screen 100 without moving the touch input instrument.

In providing a movement of the touch input instrument to the left for each of these cases, the touch input instrument may be moved, at some point, outside of the joystick touch area (e.g., from the joystick touch area into the 'g' key in FIG. 1A). The computing device may determine, in these cases, that the touch input is intended to elicit functionality of interacting with the joystick. The movement of the text cursor (e.g., to the left in these cases) may be ended when the touch input instrument is lifted from the touch-sensitive screen.

With reference to Table 1, in some aspects, when the computing device determines that a tap has been detected and is intended for the joystick (and not a key of the keyboard), subsequent continuous movement of a touch input instrument may be determined more likely to be intended for the joystick. For example, the touch input instrument may be used to tap the joystick touch area to begin a selection. Without leaving the surface of the touch-sensitive screen, the touch input instrument may be moved in a direction to the right, which extends the selection to a next character and moves the text cursor 120 past the next character. The user may, in some aspects, be able to extend the selection to the right faster by maintaining contact with touch-sensitive screen 100, with or without moving the touch input instrument. In each of these cases, the touch input instrument may be moved, at some point, outside of the joystick touch area (e.g., from the joystick touch area into the 'h' key in FIG. 1A). The computing device may determine, in these cases, that the touch input is intended to elicit functionality of interacting with the joystick. The extending of the selection may be ended when the touch input instrument is lifted from the touch-sensitive screen and/or when the touch input instrument performs a tap to signify an end of the selection.

In one or more implementations, the joystick (e.g., 110 in FIG. 1A) may be provided to give an appearance of being overlaid on, embedded in, overlapped with, or otherwise surrounded by keys of the keyboard (e.g., 105 in FIG. 1A). In some aspects, the joystick 110 is surrounded by alphanumeric keys, punctuation keys (e.g., space key, tab key, enter key, comma key), and/or backspace key, among others. In some aspects, the joystick has a different shape and/or size from the keys of the keyboard.

FIGS. 5A through 5E show additional examples of graphical user interfaces displayed on a touch-sensitive screen of a computing device, in accordance with one or more implementations. A keyboard and a joystick are provided for display within the graphical user interfaces on the touch-sensitive screens shown in FIGS. 5A through 5E and, although not shown, other features such as a work product and any associated application title bar and application menu bar may also be provided for display within the graphical user interfaces.

FIG. 5A shows an example graphical user interface displayed on a touch-sensitive screen 500 of a computing device, in accordance with one or more implementations. A joystick 505 is provided with an appearance of being surrounded by at least the keys 'g', 'h', and 'b'. The keys 'g', 'h', and 'b' are provided with an appearance of a quadrilateral shape that accommodates the joystick 505 such that the joystick 505 is not being provided with an appearance of being embedded in or overlaid on the keys 'g', 'h', and 'b'. In some aspects, an edge of the keys 'g' (e.g., lower right edge), 'h' (e.g., lower left edge), and 'b' (e.g., upper right edge) may be rounded in order to better align with the shape of the joystick 505. The joystick 505 is provided with a circular shape, although other shapes such as a square shape can be utilized. An example of a joystick 525 with a square shape in shown in FIG. 5B, which shows an example graphical user interface displayed on a touch-sensitive screen 520 of a computing device in accordance with one or more implementations.

FIG. 5C shows an example graphical user interface displayed on a touch-sensitive screen 540 of a computing device, in accordance with one or more implementations. A joystick 545 is provided with an appearance of being surround by keys 'g', 'h', 'b', and 'y'. In this example, the joystick 545 is not being provided with an appearance of being embedded in or overlaid on any keys, and keys adjacent to the joystick 545 are not different in shape from the remaining keys of the keyboard.

Figure 5E:
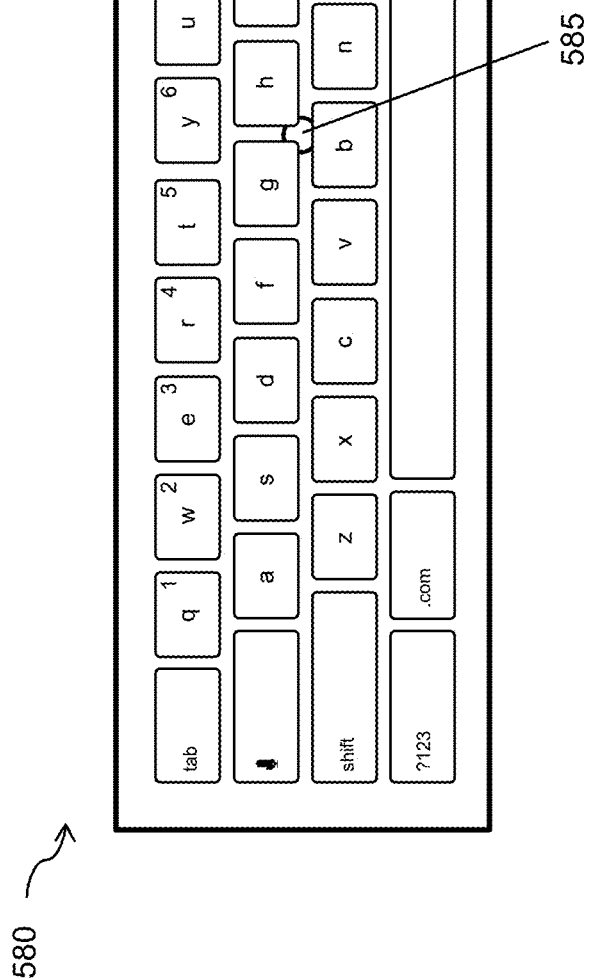
FIG. 5E shows another example of a graphical user interface displayed on a touch-sensitive screen of a computing device, in accordance with one or more implementations.

FIG. 5D shows an example graphical user interface displayed on a touch-sensitive screen 560 of a computing device, in accordance with one or more implementations. A joystick 565 is provided with an appearance of being along a side of a keyboard. FIG. 5E shows an example graphical user interface displayed on a touch-sensitive screen 580 of a computing device, in accordance with one or more implementations. A joystick 585 is provided with an appearance of being embedded between keys 'g', 'h', and 'b'.

The keyboards and/or joysticks shown in FIGS. 1A through 1C, 3, and 5A through 5E are provided by way of non-limiting example. Other appearances, shapes, and/or placements of the keyboards and/or joysticks are possible, and may be set by a user based on a user's preferences. A user may be able to set a color of the keys of the keyboard and/or the joystick. A user may be able to provide preferences regarding a size of a joystick in relation to a joystick touch area of the joystick. In some aspects, more than one keyboard and/or more than one joystick may be provided on a touch-sensitive screen. For example, two different keyboards (e.g., of different language) may be simultaneously displayed to a user, with each keyboard having an associated joystick.

Figure 6:
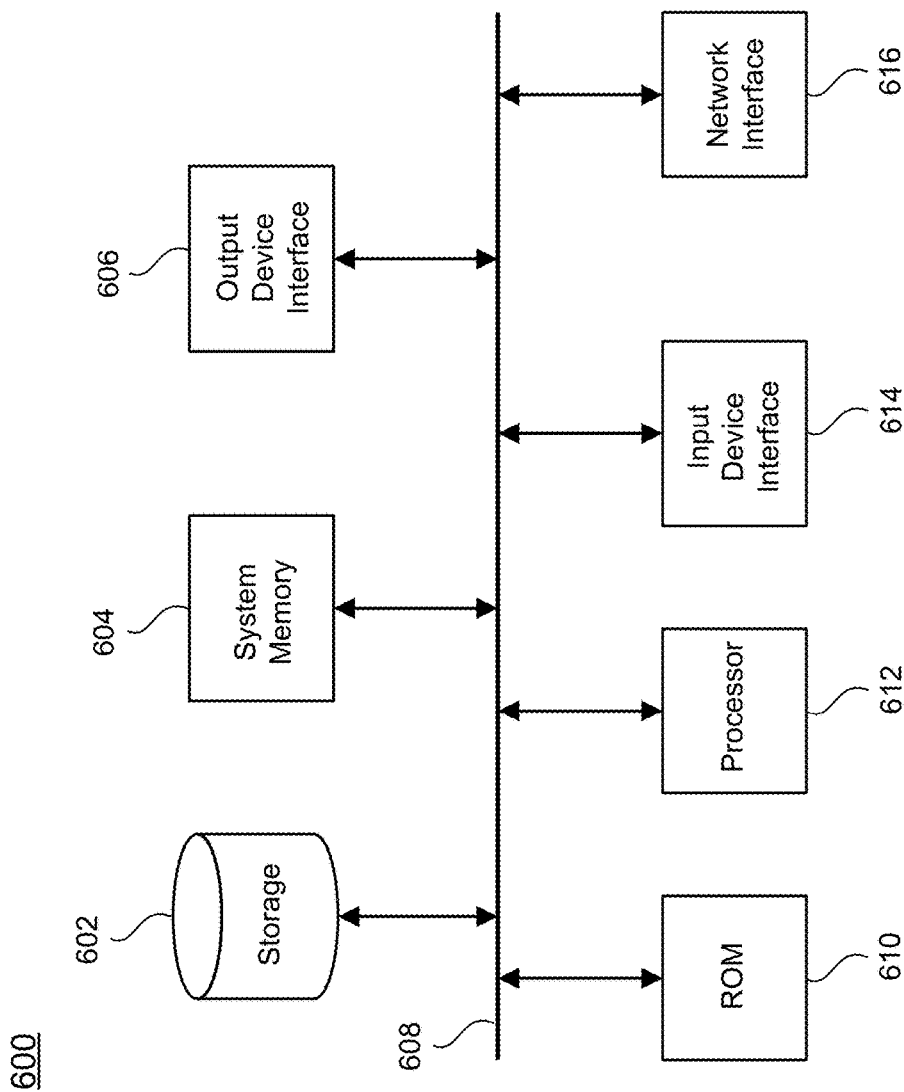
FIG. 6 conceptually illustrates an example electronic system with which some implementations of the subject technology can be implemented.

FIG. 6 conceptually illustrates an example electronic system with which some implementations of the subject technology can be implemented. Electronic system 600 can be a desktop computer, a laptop computer, a handheld computer, a PDA, a cellular telephone, a network appliance, a camera, a smart phone, a EGPRS mobile phone, a media player, a navigation device, an email device, a game console, or a combination of any of these data processing devices or other data processing devices. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616. The electronic system 600 may include or may otherwise be in communication with (e.g., connected to physically or wirelessly) a touch-sensitive screen (e.g., 100 in FIG. 1A).

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (for example, a magnetic or optical disk and its corresponding disk drive) as permanent storage device 602.

Other implementations use a removable storage device (for example, a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as a random access memory. System memory 604 stores some of the instructions and data that the processor needs at runtime. In some implementations, the processes of the subject disclosure are stored in system memory 604, permanent storage device 602, or ROM 610. For example, the various memory units include instructions for providing a virtual joystick on a touch-sensitive screen, in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, for example, cathode ray tubes (CRT) or liquid crystal displays (LCD). Some implementations include devices, for example, a touch-sensitive screen that functions as both input and output devices. Functionality as both input and output devices may be provided, for example, by one or more of the touch input sensor 205, processor 210, and memory 215 shown in FIG. 2. The images generated by the electronic system 600 may include a graphical user interface with a virtual keyboard and virtual joystick that is to be provided for display on a touch-sensitive screen.

Finally, as shown in FIG. 6, bus 608 also couples electronic system 600 to a network (not shown) through a network interface 616. In this manner, the computer can be a part of a network of computers (for example, a local area network (LAN), a wide area network (WAN), or an Intranet, or a network of networks, for example, the Internet). Any or all components of electronic system 600 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a machine or computer. A computer readable medium can be one or more computer readable media and a machine readable medium can be one or more machine readable media. These terms exclude any wireless signals, wired download signals, and any other ephemeral signals.

To provide for interaction with a user, implementations of the subject matter described in this specification can include usage of a computer having a display device, e.g., CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. §112, sixth paragraph, unless the element is expressly recited using the phrase "means for" or, in the case of a method claim, the element is recited using the phrase "step for". Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A machine-implemented method, comprising:
   providing for display a keyboard and a joystick on a touch-sensitive screen of a computing device, wherein the joystick is associated with a first area on the touch-sensitive screen;
   detecting a touch input on the touch-sensitive screen;
   determining whether at least a portion of the touch input is within the first area;
   determining a type of the touch input based at least on a history of prior touch inputs detected on the touch-sensitive screen, the history of prior touch inputs including at least one touch input corresponding to a key of the keyboard;
   determining that the touch input is intended for the joystick based at least in part on how recent a particular prior touch input of the key of the keyboard was detected on the touch-sensitive screen; and
   performing an action associated with a text cursor based on the determined type of the touch input and determining that the touch input is intended for the joystick.

2. The method of claim 1, wherein the joystick is adjacent to at least two keys of the keyboard.

3. The method of claim 1, wherein
   determining the type of the touch input is further based on at least one of a pressure, speed, or duration associated with the touch input, wherein the action is further based on the determined type of the touch input.

4. The method of claim 1, further comprising:
   providing for display text on the touch-sensitive screen; and
   providing for display the text cursor on the touch-sensitive screen.

5. The method of claim 4, wherein the action associated with the text cursor comprises moving the text cursor without adding characters to the text on the touch-sensitive screen or deleting any characters from the text on the touch-sensitive screen.

6. The method of claim 4, wherein:
   the touch input occurs when the text cursor is at a first position on the touch-sensitive screen, and
   performing the action comprises selecting one or more words of the text, wherein at least one of the one or more words contains the text cursor during the touch input.

7. The method of claim 4, wherein:
   the touch input occurs when the text cursor is at a first position on the touch-sensitive screen, and
   performing the action comprises moving the text cursor from the first position to a second position on the touch-sensitive screen.

8. The method of claim 4, wherein:
   the touch input occurs when the text cursor is at a first position on the touch-sensitive screen, and
   performing the action comprises initiating selection at the first position.

9. The method of claim 8, wherein:
   performing the action further comprises extending, starting from the first position, the selection along a direction on the touch-sensitive screen, and
   the direction is based on the touch input.

10. A computing system, comprising:
    one or more processors; and
    a non-transitory machine-readable medium comprising instructions stored therein, which when executed by the one or more processors, cause the one or more processors to perform operations comprising:
      providing for display a keyboard and a joystick on a touch-sensitive screen associated with the computing system, wherein the joystick is associated with a first area on the touch-sensitive screen and is adjacent to at least two keys of the keyboard;
      detecting a touch input on the touch-sensitive screen;
      determining whether at least a portion of the touch input is within the first area;
      determining a type of the touch input based at least on a history of prior touch inputs detected on the touch-sensitive screen, the history of prior touch inputs including at least one touch input corresponding to a key of the keyboard;

determining that the touch input is intended for the joystick based at least in part on how recent a particular prior touch input of the key of the keyboard was detected on the touch-sensitive screen; and performing an action associated with a text cursor based on the type of the touch input and determining that the touch input is intended for the joystick.

11. The computing system of claim 10, wherein determining the type of the touch input is further based on at least one of a pressure, speed, or duration associated with the touch input, wherein the action is based on the determined type of the touch input.

12. The computing system of claim 10, wherein the operations further comprise:

providing for display text on the touch-sensitive screen; and providing for display the text cursor on the touch-sensitive screen.

13. The computing system of claim 12, wherein the action associated with the text cursor comprises moving the text cursor without adding characters to the text on the touch-sensitive screen or deleting any characters from the text on the touch-sensitive screen.

14. The computing system of claim 12, wherein the text is associated with an application that is running on the computing system.

15. The computing system of claim 10, wherein the joystick displayed on the touch-sensitive screen is different in size than the first area.

16. A non-transitory machine-readable medium comprising instructions stored therein, which when executed by a machine, cause the machine to perform operations comprising:

providing for display a keyboard and a joystick on a touch-sensitive screen, wherein the joystick is associated with a first area on the touch-sensitive screen;

detecting a touch input on the touch-sensitive screen;

determining that at least a portion of the touch input is within the first area;

determining a type of the touch input based at least on a history of prior touch inputs detected on the touch-sensitive screen, the history of prior touch inputs including at least one touch input corresponding to a key of the keyboard;

determining that the touch input is intended for the joystick based at least in part on how recent a particular prior touch input of the key of the keyboard was detected on the touch-sensitive screen; and performing an action associated with a text cursor based on at least one of a pressure or speed associated with the type of the touch input and determining that the touch input is intended for the joystick.

17. The non-transitory machine-readable medium of claim 16, the joystick is adjacent to at least two keys of the keyboard.

18. The method of claim 1, wherein determining that the touch input is intended for the joystick further comprises:

determining that multiple prior instances of performing a touch-and-drag touch input is within the first area on the touch-sensitive screen and within a different area on the touch-sensitive screen of a particular key of the keyboard.

* * * * *